United States Patent [19]

Davis

[11] Patent Number: 4,964,313

[45] Date of Patent: Oct. 23, 1990

[54] TWO-SPEED GEAR TRAIN ASSEMBLY

[75] Inventor: Alan R. Davis, Plainwell, Mich.

[73] Assignee: Eaton Corporation, Cleveland, Ohio

[21] Appl. No.: 261,955

[22] Filed: Oct. 24, 1988

[51] Int. Cl.$^5$ .............................................. F16H 3/08
[52] U.S. Cl. .................................... 74/331; 74/339;
192/48.91; 192/67 R
[58] Field of Search ............... 74/370, 372, 361, 359,
74/333, 331, 339, 457; 192/48.91, 108, 87.14, 67 R

[56] References Cited

U.S. PATENT DOCUMENTS

| | | | |
|---|---|---|---|
| 1,425,214 | 8/1922 | Parco | 192/87.14 X |
| 1,907,171 | 5/1933 | Anderson | 192/87.14 X |
| 3,249,188 | 5/1966 | Maina | 192/67 R |
| 3,283,613 | 11/1966 | Perkins | 74/745 |
| 3,362,245 | 1/1968 | Francuch et al. | 74/359 |
| 3,425,527 | 2/1969 | Wolf | 192/87.14 X |
| 3,799,002 | 3/1974 | Richards | 74/745 |
| 3,910,131 | 10/1975 | Richards | 192/48.91 X |
| 3,924,484 | 12/1975 | Richards | 74/372 X |
| 3,952,838 | 4/1976 | Osten et al. | 192/67 X |
| 4,375,172 | 3/1983 | Richards et al. | 74/339 |
| 4,452,094 | 6/1984 | Schetter | 192/48.91 X |
| 4,553,623 | 11/1985 | Ohkubo | 192/48.91 X |
| 4,573,371 | 3/1986 | Akutagawa | 74/339 |
| 4,674,358 | 6/1987 | Nishimura | 74/745 |
| 4,677,867 | 7/1987 | Sumihi | 192/48.91 X |
| 4,697,677 | 10/1987 | Janiszewski | 192/48.91 |
| 4,754,665 | 7/1988 | Vandervoort | 74/745 |
| 4,788,889 | 12/1988 | Davis et al. | 74/331 X |

FOREIGN PATENT DOCUMENTS

| | | |
|---|---|---|
| 0184077 | 11/1985 | European Pat. Off. . |
| 0233480 | 8/1987 | European Pat. Off. . |
| 666098 | 6/1988 | Switzerland . |

Primary Examiner—Dirk Wright
Attorney, Agent, or Firm—H. D. Gordon

[57] ABSTRACT

A two-speed gear train (200) including a first gear (118) and a second gear (120) and drive members (11, 114, 106) for driving the second gear faster than the first gear. A double acting clutch (126) splined to a shaft (28A) has a first and second position for clutching either the first gear (118) or second gear (120) to the shaft (28A). The clutch teeth (134, 136, 138, 140) are provided with specially configured ramps (222) on certain edges (208, 210, 212, 214) to improve clutch engagement.

10 Claims, 7 Drawing Sheets

| RATIO NO. | HIGH RANGE | LOW RANGE |
|---|---|---|
| 16 | 0.86 | |
| 15 | 1.00 | |
| 14 | 1.16 | |
| 13 | 1.35 | |
| 12 | 1.56 | |
| 11 | 1.82 | |
| 10 | 2.10 | |
| 9 | 2.46 | |
| 8 | | 2.84 |
| 7 | | 3.36 |
| 6 | | 3.88 |
| 5 | | 4.54 |
| 4 | | 5.25 |
| 3 | | 6.12 |
| 2 | | 7.07 |
| 1 | | 8.26 |
| Lo | | 13.08 |
| LoLo | | 15.17 |

| RATIO NO. | MAIN SECTION GEAR ENGAGED TO MAINSHAFT | GEAR ENGAGED BY CLUTCH 126 | GEAR ENGAGED BY CLUTCH 128 |
|---|---|---|---|
| LoLo | 56 | 120 | 124 |
| Lo | 56 | 118 | 124 |
| 1 | 54 | 120 | 124 |
| 2 | 54 | 118 | 124 |
| 3 | 52 | 120 | 124 |
| 4 | 52 | 118 | 124 |
| 5 | 50 | 120 | 124 |
| 6 | 50 | 118 | 124 |
| 7 | 24 | 120 | 124 |
| 8 | 24 | 118 | 124 |
| 9 | 54 | 120 | 120 |
| 10 | 54 | 118 | 120 |
| 11 | 52 | 120 | 120 |
| 12 | 52 | 118 | 120 |
| 13 | 50 | 120 | 120 |
| 14 | 50 | 118 | 120 |
| 15 | 24 | 120 | 120 |
| 16 | 24 | 118 | 120 |
| $R_{LO}$ | 58 | 120 | 124 |
| $R_H$ | 58 | 120 | 120 |

TWO-SPEED GEAR TRAIN ASSEMBLY

BACKGROUND OF THE INVENTION

1. Field of The Invention

The present invention relates to a two-speed gear train assembly, such as a splitter type auxiliary section or subsection of a compound multi-speed transmission. In particular, the present invention relates to a two-speed gear train utilizing non-synchronized, clash type jaw clutches which are specifically configured to provide relatively simple and reliable clutching structures for smooth and easy shifting without the need for complicated control devices or the like.

2. Brief Description of the Prior Art

Compound change gear transmissions of the type having one or more auxiliary sections connected in series with a main transmission section are well known in the prior art. Briefly, by utilizing main and auxiliary transmission sections connected in series, assuming proper sizing of the ratio steps, the total of available transmission ratios is equal to the product of the main and auxiliary section ratios.

Auxiliary transmission sections are of three general types: range type, splitter type or combined range/splitter type.

In compound transmissions having a range type auxiliary section, the ratio step or steps are greater than the total ratio coverage of the main transmission section and the main section is shifted progressively through its ratios in each range. Examples of compound transmissions having range type auxiliary sections may be seen by reference to U.S. Pat. Nos. 3,105,395; 2,637,222 and 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. Nos. 4,290,515; 3,799,002; 4,375,172; 4,440,037 and 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range.

One example of a compound transmission having a single combined range/splitter type auxiliary section may be seen by reference to U.S. Pat. Nos. 3,283,613; 3,648,546, the disclosures of which are hereby incorporated by reference and to publication Small Scale Print No. 016-AD; Fuller Transmissions; Models RT-14613, RTO-14613, RTOO-14613, published March 1981 by Eaton Corporation, assignee of this invention, the disclosure of which is hereby incorporated by reference. Another example is the "Ecosplit" model of transmission sold by Zahnradfabrik Friedrichshafen Aktiengeseushaft of Friedrichshafen, Federal Republich of Germany which utilizes a separate splitter auxiliary section in front of, and a separate range auxiliary section behind, the main transmission section.

A preferred example of a compound transmission having a three-layer, four-speed combined range/splitter type auxiliary section may be seen by reference to U.S. Pat. No. 4,754,665, the disclosure of which is incorporated by reference.

It should be noted that the terms main and auxiliary sections are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

The prior art comPound change gear transmissions of the type having both range and splitter type auxiliary section gearing, such as the "Roadranger" type offered by Eaton Corporation and the "Ecosplit" type offered by Zahnradfabrik Friedrichshafen Aktiengesbushaft, are well received and widely used in manually shifted heavy duty vehicles. However, these and other types of prior art compound change gear transmissions are not totally satisfactory as rather sensitive shifting procedures were required for splitter types of shifts or the splitter clutches required synchronizing mechanisms and/or master clutch interlocks were required to protect the splitter clutch synchronizers. Referring specifically to auxiliary sections where the splitter clutches were not synchronized, the operation of the usually air actuated non-synchronized jaw clutches involved controlling the greatest out of synchronous rotation at which the clutches would engage by controlling shift yoke engagement force and clutch backlash. The correct balance between backlash and engaging force was difficult to achieve and maintain. Too much backlash and/or engagement force resulted in unacceptably harsh clutch engagements while too little force and/or backlash resulted in missed shifts.

SUMMARY OF THE INVENTION

In accordance with the present invention, the drawbacks of the prior art have been overcome to the extent that a two-speed gear train, such as the splitter auxiliary section or subsection of a compound transmission, having a relatively simple and reliable easily shifted, smoothly engaging, non-synchronized, clutching mechanism is provided.

The above is accomplished in a two-speed gear train having a first and second gear selectively clutchable to a common shaft, the second gear always driven at a greater rotational speed than the first gear, and a clutching mechanism having only a first selectable position for clutching the first gear to the shaft and a second position for clutching the second gear to the shaft, the clutching mechanism including first clutch members fixed for rotation with the gears and complimentary second clutch members fixed for rotation with the shaft.

In such a drive train, as the clutch mechanism is moved directly from one of the two positions to the other, the shaft and second clutch members fixed thereto will be rotating at substantially the speed of the just disengaged gear and will always have the same relative rotation relative to the gear being engaged and the clutch members rotating therewith. AccordinglY, for a given direction of shaft rotation, such as the direction corresponding to forward movement of a vehicle in which a transmission is installed, disengaging the first gear from, and engaging the second gear to, the shaft will cause the leading edges of the engaging first clutch member clutch teeth and the trailing edges of the engaging second clutch member clutch teeth to engage as the shaft and second gear move toward synchronous rotation. Conversely, in the given direction of rotation, disengaging the second gear from, and engaging the first gear to, the shaft will cause the trailing edges of the engaging first clutch member clutch teeth and the leading edges of the engaging second clutch members clutch teeth to engage as the shaft and first gear move towards synchronous rotation.

In the present invention, the leading edges of the first clutch member clutch teeth and/or the trailing edges of the second clutch member clutch teeth associated with ;the second gear, and the trailing edges of the first clutch member clutch teeth and/or the leading edges of the second clutch member clutch teeth associated with the first gear are provided with ramped surfaces which, under the relatively light engagement force urging the clutch members into engagement, will interact to cause the clutch members to be urged axially apart and ratchet out of axial engagements. As soon as the engaging clutch members achieve synchronous rotation, the ramp surfaces of the engaging clutch teeth will not be urged into engagement and, due to the relatively large initial penetration of the interengaging clutch teeth due to engagement occurring along a ramp, the clutch members will achieve a rapid and smooth engagement.

Additionally, the clutches are relatively insensitive to backlash and thus less expensive to produce.

Accordingly, it is an object of the invention to provide a two-sPeed gear train assembly having a relatively simple and reliable nonsynchronized jaw clutch assemblY for Providing relatively smooth and easily accomplished shifts.

This and other objects and advantages of the present invention will become aPParent from a reading of the detailed description of the preferred embodiment taken in connection with the attached drawings.

DESCRIPTION OF THE EMBODIMENT

Figure 3:
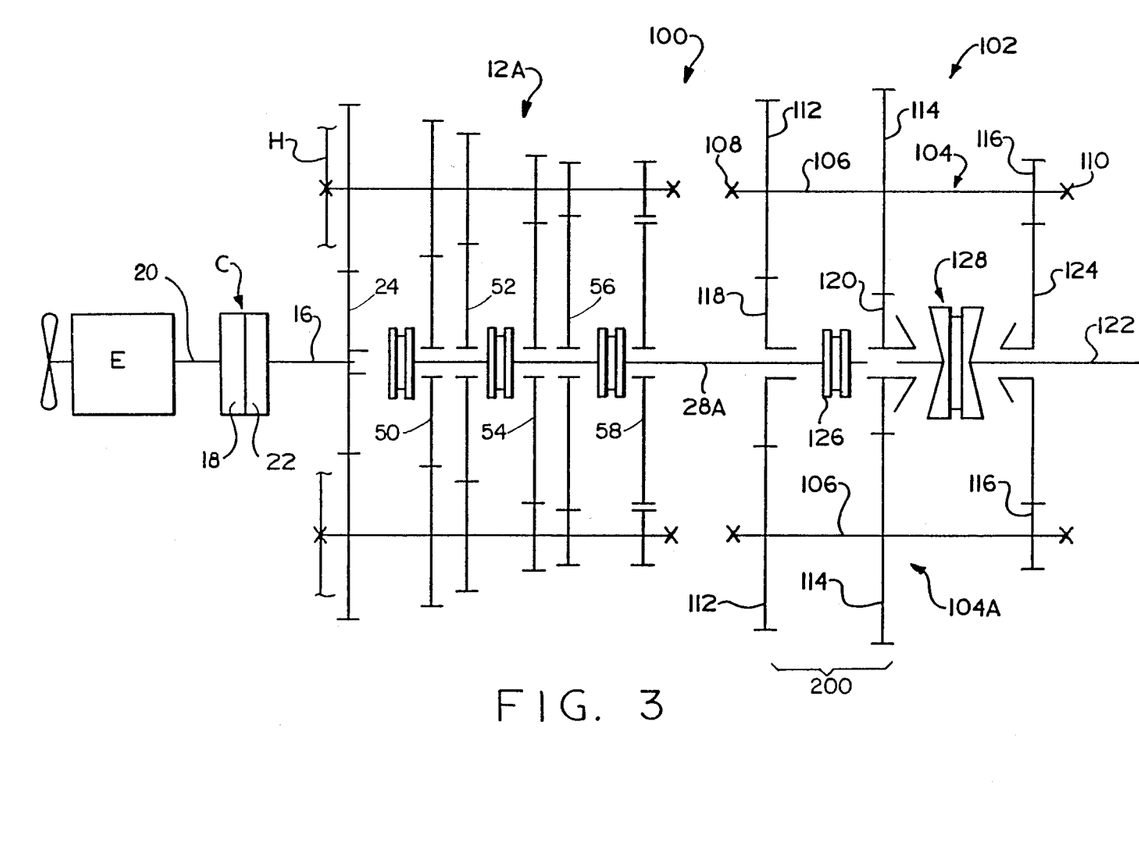
FIG. 3 is a schematic illustration of a compound transmission utilizing the auxiliary section of the present invention.

Certain terminology will be used in the following description for convenience only and will not be limiting. The words "upwardly", "downwardly", "rightwardly" and "leftwardly" will designate directions in the drawings to which reference is made. The words "forward" and "rearward" will refer respectively to the front and rear ends of the transmission as conventionally mounted in the vehicle, being respectively to the left and right sides of the transmission as illustrated in FIG. 3. The words "inwardly" and "outwardly" will refer to directions toward and away from, respectively, the geometric center of the device and designated parts thereof. Said terminology includes the words above specifically mentioned, derivatives thereof and words of similar import.

The term "compound transmission" is used to designate a change speed or change gear transmission having a main transmission section and an auxiliary transmission section connected in series whereby the selected gear reduction in the main transmission section may be compounded by further selected gear reduction in the auxiliary transmission section. The term "upshift" as used herein shall mean the shifting from a lower speed gear ratio to a higher speed gear ratio. The term "downshift" as used herein shall mean the shifting from a higher speed gear ratio to a lower speed gear ratio. The terms "low speed gear" or "low gear" as used herein shall designate a gear ratio utilized for relatively lower forward speed operation in a transmission, i.e., a set of gears having a higher ratio of reduction of output shaft speed relative to the speed of the input shaft. "Synchronize clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation and relative large capacity friction means are associated with the clutch members and are sufficient, upon initiation of a clutch engagement, to cause the clutch members and all members rotating therewith to rotate at a substantially synchronous speed.

Referring to FIGS. 3, 3A, 4A and 4B, there is illustrated a compound eighteen-forward speed transmission 100 comprising a multi-speed main transmission section 12A and an auxiliary section 102 connected in series therewith. Transmission 100 is disclosed and described in detail in above-mentioned U.S. Pat. No. 4,754,655.

Typically, transmission 100 is housed within a single housing and includes an input shaft 16 driven by a prime mover such as diesel engine E through a selectively disengaged, normally engaged friction master clutch C having an input or driving section 18 drivingly connected to the engine crank shaft 20 and a driven portion 22 rotatably fixed to the transmission input shaft 16.

Preferably, each of the main section mainshaft gears encircles the mainshaft 28A and is in continuous meshing engagement with and is floatingly supported by the associated countershaft gear group, which mounting means and a special advantages resulting therefrom are explained in greater detail in U.S. Pat. Nos. 3,105,395 and 3,335,616, the disclosures of which are hereby incorporated by reference. Typically, clutch collars are axially positioned by means of shift forks (not illustrated) associated with a shift bar housing assembly (not illustrated) as well known in the prior art.

Figure 4A:
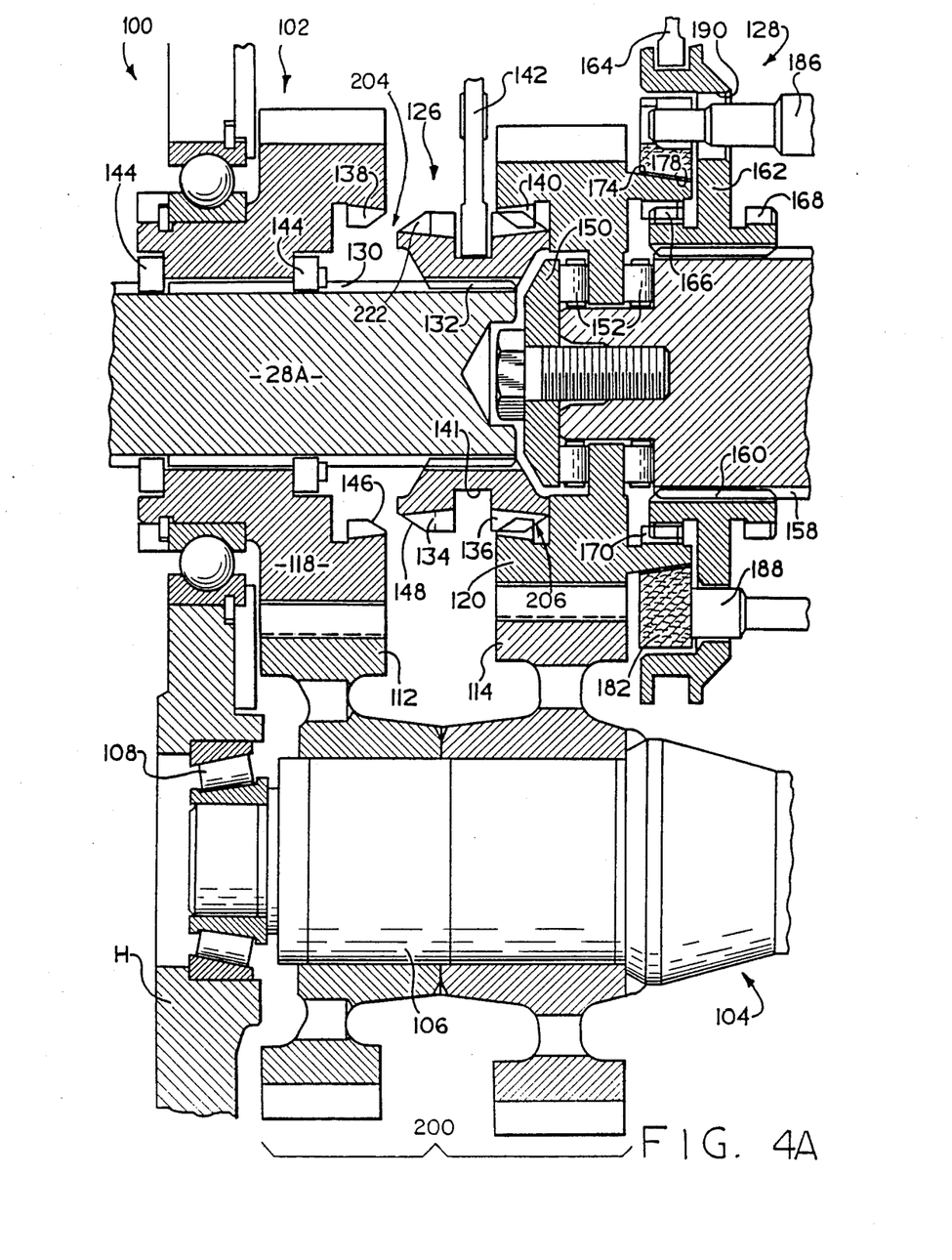
FIGS. 4A and 4B are a plan view, in section, of the auxiliary section of this present invention.
Figure 4B:
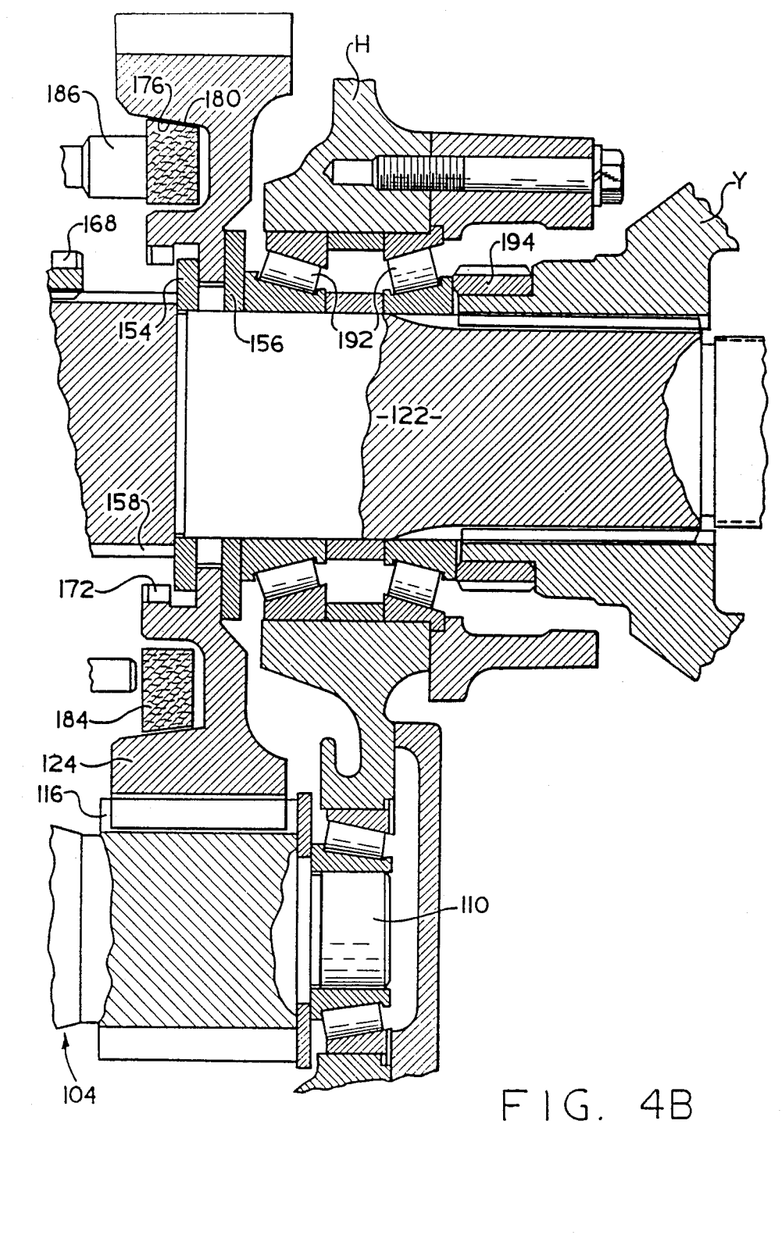

Auxiliary transmission section 102 includes two substantially identical auxiliary countershaft assemblies 104 and 104A, each comprising an auxiliary countershaft 106 supported by bearings 108 and 110 in housing H and carrying three auxiliary section countershaft gears 112, 114 and 116 fixed for rotation therewith. Auxiliary countershaft gears 112 are constantly meshed with and support auxiliary section splitter gear 118 which surrounds mainshaft 28A. Auxiliary countershaft gears 114 are constantly meshed with and support auxiliary section splitter/range gear 120 which surrounds the output shaft 122 at the end thereof adjacent the coaxial end of mainshaft 28A. Auxiliary section countershaft gears 116 constantly mesh and support auxiliary section range gear 124, which surrounds the output shaft 122. Accordingly, auxiliary section countershaft gears 112 and splitter gear 118 define a first gear layer, auxiliary section countershaft gears 114 and splitter/range gear 120 define a second gear layer and auxiliary section countershaft gears 116 and range gear 124 define a third layer, or gear group of the combined splitter and range type auxiliary transmission section 102.

A sliding two position jaw clutch collar 126 is utilized to selectively couple either the splitter gear 118 or the splitter/range gear 120 to the mainshaft 28A, while a two position synchronized assembly 128 is utilized to selectively couple the splitter/range gear 120 or the range gear 124 to the output shaft 122. The structure and function of double acting sliding jaw clutch collar 126 is substantially identical to the structure and function of sliding clutch collar 96 utilized in connection with transmission 10 while the structure and function of double acting synchronized clutch assembly 128 is substantially identical to the structure and function of synchronized clutch assembly 92 utilized in connection with transmission 10. Synchronized clutch assembly 128 are well known in the prior art and examples thereof may be seen by reference to U.S. Pat. Nos. 4,462,489; 4,125,179 and 2,667,955, the disclosures of all of which are incorporated by reference.

The detailed structure of the preferred embodiment of auxiliary section 102 is illustrated in FIG. 3, wherein it may be seen that the rearward end of mainshaft 28A extending into the auxiliary transmission section 102 is provided with external splines 130 which mate with internal splines 132 provided on clutch collar 126 for rotationally coupling clutch collar 126 to the mainshaft 28A while allowing relative axial movement therebetween. The clutch collar 126 is provided with clutch teeth 134 and 136 for selective axial engagement with clutch teeth 138 and 140 provided on gears 118 and 120, respectively. The clutch collar 126 is also provided with a groove 141 for receipt of a shift fork 142.

Gear 118 surrounds mainshaft 28A and is normally free to rotate relative thereto and is axially retained relative to the mainshaft 28A by means of retainers 144. Clutch teeth 136 and 138 present tapered surfaces 146 and 148 which are inclined at about 35° relative to the axis of the mainshaft 28A which provides an advantageous interaction tending to resist nonsynchronous engagement and also tending to cause a synchronous rotation as is described in greater detail in U.S. Pat. No. 3,265,173, the disclosure of which is hereby incorporated by reference. Clutch teeth 136 and 140 are provided with similar complementary tapered surfaces.

Splitter/range gear 120 is rotatably supported at the inward end 150 of output shaft 122 by means of a pair of thrust bearings 152 while range gear 124 surrounds the output shaft 122 and is axially retained thereon by means of thrust washers 154 and 156. Located axially between gears 120 and 124, and rotationally fixed to output shaft 122 by means of external splines 158 and internal splines 160, is the double acting two Position synchronized clutch assembly 128. Many of the well known synchronized positive clutch structures are suitable for use in the auxiliary transmission section of the present invention. The synchronized clutch assembly 128 illustrated is of the pin type described in above mentioned U.S. Pat. No. 4,462,489. Briefly, the synchronized clutch assembly 128 includes a slidable jaw clutch member 162 axially positioned by a shift fork 164 and carrying clutch teeth 166 and 168, respectively, for axial engagement with clutch teeth 170 and 172, respectively, carried by gears 120 and 124, respectively. Gears 120 and 124 define cone friction surfaces 174 and 176, respectively, for frictional synchronizing engagement with matching frictional cone surfaces 178 and 180, respectively, carried by the friction rings 182 and 184, respectively, of the synchronized clutch assembly. Blocker pins 186 and 188 are rotationally fixed to the friction rings 184 and 182, respectively, and interact with blocker openings 190 carried by the sliding member 162 to provide the blocking function as is well known in the prior art. Synchronizing assembly 128 may also include a plurality of spring pins (not shown) for providing initial engagement of the conical friction surfaces at the initiation of a clutch engagement operation.

Output shaft 122 is supported by bearings 192 in housing H and extends therefrom for attachment of a yolk member Y or the like which typically forms a portion of a universal joint for driving a propeller shaft to a differential or the like. The output shaft 122 may also carry a speedometer gear 194 and/or various sealing elements (not shown).

Figure 5:
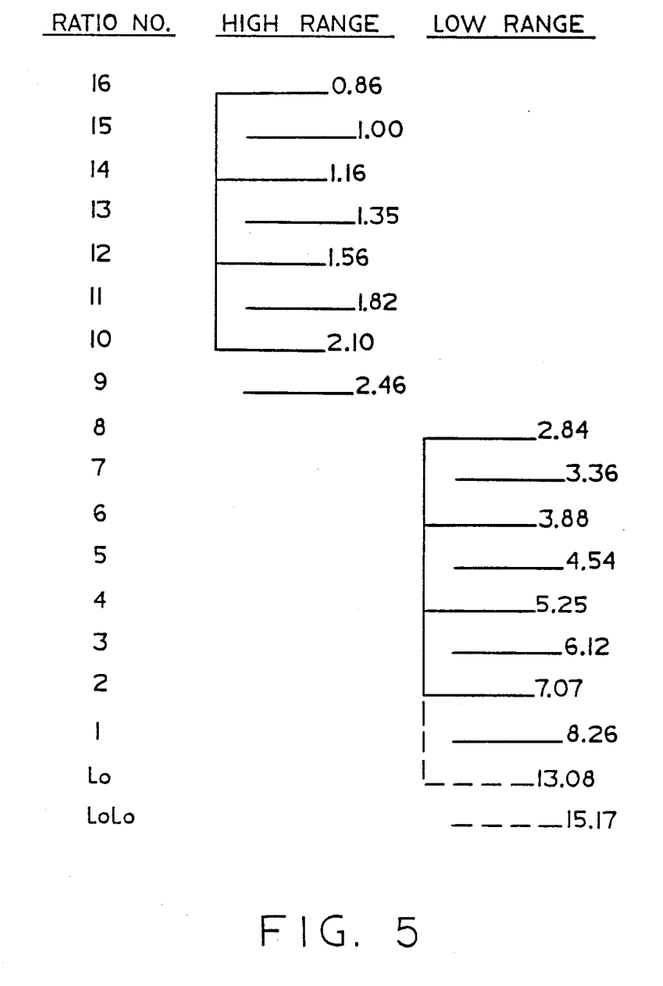
FIG. 5 is a chart illustrating typical ideal ratios for a compound change gear transmission of the type illustrated in FIG. 3.
Figure 6:
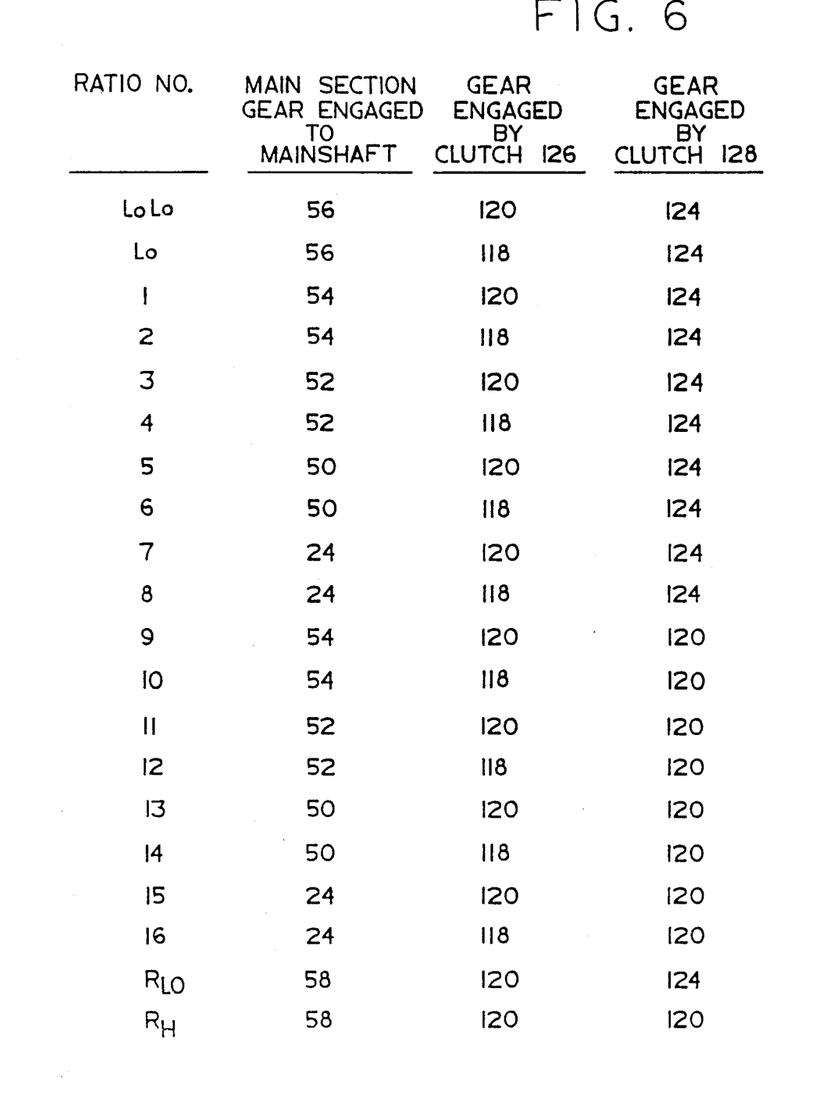
FIG. 6 is a chart illustrating the clutch positions for the various selectable ratios of a compound transmission of the type illustrated in FIGS. 2 and 3.

As may be seen by reference to FIGS. 5 and 6, by selectively axially positioning both the splitter clutch 126 and the range clutch 128 in the forward and rearward axial positions thereof, four distinct ratios of main shaft rotation to output shaft rotation may be provided. Accordingly, auxiliary transmission section 102 is a 3-layer auxiliary section of the combined range and splitter type providing four selectable speeds or drive ratios between the input (countershaft 28A) and output (output shaft 122) thereof. In compound transmission 100 the main section 12A provides a reverse and five potentially selectable forward speeds. However, one of these selectable forward gear ratios is often a creeper or low gear not intended to be used in the high range. Thus transmission 100 is properly designated as a $(4+1) \times (2) \times (2)$ type transmission providing 17 or 18 selectable forward speeds depending upon the desirability and/or practicality of splitting the low or creeper gear.

While clutch 128, the range clutch, should be a synchronized clutch, double acting clutch collar 126, the splitter clutch, according to the present invention, is a specially configured non-synchronized clutch.

Figure 3A:
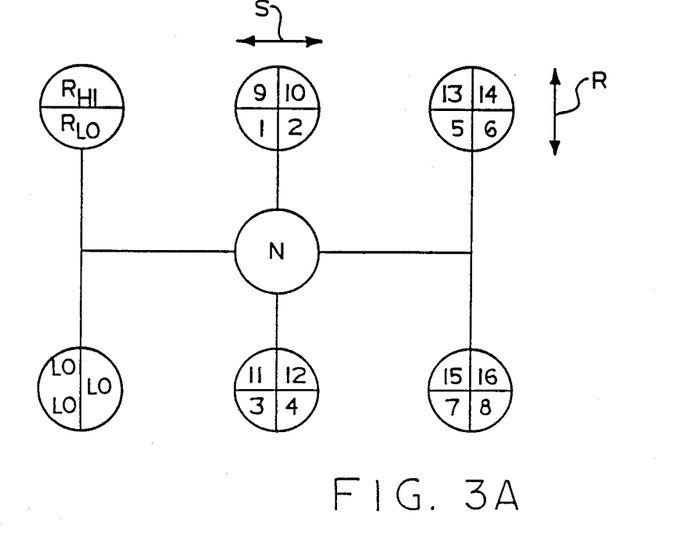
FIG. 3A is a schematic illustration of the shift pattern for the transmission of FIG. 2.

The shift pattern for shifting transmission 100 is schematically illustrated in FIG. 3A. Divisions in the vertical direction illustrate range shifts while divisions in the horizontal direction illustrate splitter shifts.

A method of selecting desirable gear ratios is schematically illustrated by reference to FIG. 5. Disregarding the creeper (illustrated in dashed lines) and reverse ratios, and assuming that it is desirable that a transmission have generally equal ratio steps, the main section ratio steps should be generally equal, the splitter step should be generally equal to the square root of the main section ratio steps and the range step should equal about the main section ratio step raised to the N power where N equals the number of main section ratio steps occurring in both ranges (i.e. N=4 in the (4+1)×(2)×(2) transmission). Given the desired ideal ratios, gearing to approximate these ratios is selected.

Referring to FIGS. 3, 4A and 4B and assuming by way of example that gears 118, 120, 124, 112, 114 and 116, respectively, have 40, 38, 54, 41, 45 and 19 teeth each, respectively, the following four auxiliary section ratios are obtainable:

(1). Clutch 126 engaged to gear 120 and clutch 128 engaged to gear 124 provides an auxiliary section reduction of about 3.365:1;

(2). Clutch 126 engaged to gear 118 and clutch 128 engaged to gear 124 provides an auxiliary section reduction of about 2.913:1;

(3) Clutch 126 engaged to gear 120 and clutch 128 engaged to gear 120 provides an auxiliary section reduction about 1.000:1; and (4). Clutch 126 engaged to gear 118 and clutch 128 engaged to gear 120 provides an auxiliary section reduction of about 0.865:1.

In the above example, the splitter steps are about 15.6% while the range step is about 336.6% which is generally suitable for a "4+1" main transmission section having about 35% steps as the square root of 1.35 equals about 1.16 and 1.35 raised to fourth power (i.e. N=4) equals about 3.32. FIG. 6 illustrates the various gears engaged for the various selectable forward speeds of transmission 100.

The above example illustrates an "overdrive" type transmission. As is known in the transmission art, a "direct drive" transmission may be provided utilizing the auxiliary transmission section of the present invention by reversing the splitter and splitter/range gear sets and also reversing the sequence of operation of splitter clutch 126. By way of example, for such a transmission, gears 118, 120, 112 and 114 would have 38, 40, 45 and 41 teeth each, respectively, and splitter clutch 126 would engage gear 118 in gears ratios 1, 3, 5, 7, 9, 11, 13, 15 and gear 120 in gear ratios 2, 4, 6, 8, 10, 12, 14 and 16. Such a transmission would, by way of example, provide the same splitter step as discussed above but a somewhat smaller range step. Of course, by modifying the numbers of teeth on the various auxiliary section gears, acceptable range and splitter steps may be provided.

Figure 1:
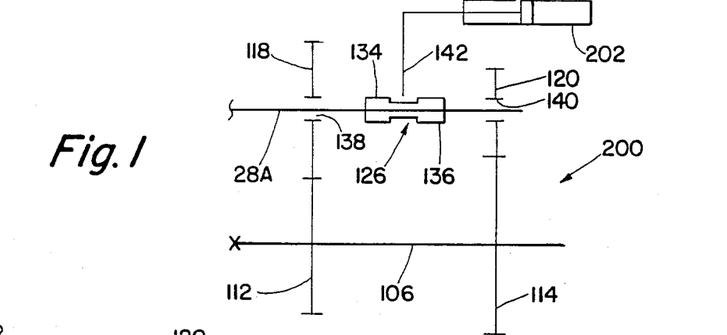
FIG. 1 is a schematic illustration of the two-speed gear train assembly of the present invention.
Figure 1A:
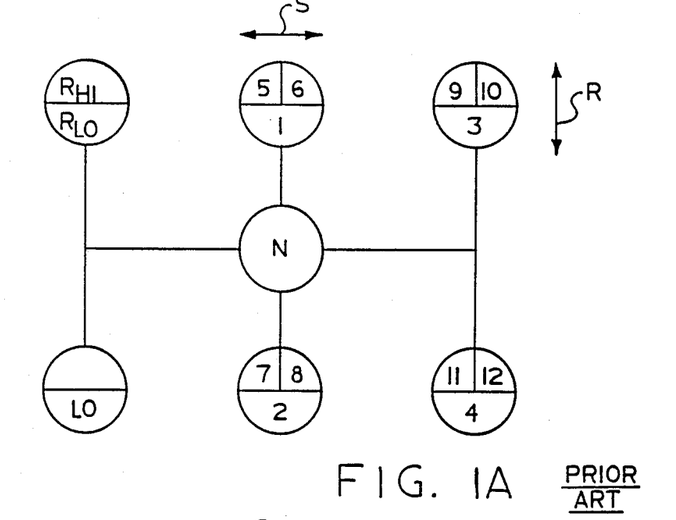
FIG. 1A shows a prior art shift pattern.

Referring to FIG. 1, the splitter type auxiliary subsection 200 of the present invention is schematically illustrated. The two-speed gear train assembly 200 comprises the mainshaft 28A which is surrounded by splitter gear 118 and splitter/range gear 120, both rotatable relative to shaft 28A and selectively clutchable one at a time thereto by two position sliding clutch collar 126. Sliding clutch 126 is fixed to shaft 28A by splines 130/132 for rotation therewith and is axially positioned by shift fork 142 and two-position pressurized fluid actuation 202 to a first position for engaging gear 118 to shaft 28A or to a second position (FIG. 4A) for engaging gear 120 to shaft 28A.

Gear 118 constantly meshes with auxiliary countershaft gear 112, gear 120 constantly with auxiliary countershaft gear 114. Both auxiliary countershaft gears 112 and 114 are fixed for rotation with auxiliary countershaft 106.

Gear 118 carries clutch teeth 138 for selective engagement with clutch teeth 134 carried by sleeve 126 while gear 120 carries clutch teeth 140 for selective engagement with clutch teeth 136 carried by sleeve 126. Accordingly, clutch teeth 138 and 134 define a first positive clutch 204 associated with engagement and disengagement of gear 118 and shaft 28A while clutch teeth 140 and 136 define a second positive clutch 206 associated with engagement and disengagement of gear 120 and shaft 28A.

The actuator 202 is preferably fluid (gas) actuated to urge the clutch teeth into engagement in a resilient manner and the clutch members, 138, 134, 140 and/or 136 may be resiliently movable as illustrated in abovementioned U.S. Pat. No. 3,799,002.

As gears 118, 120, 112 and 114 have 40, 38, 41 and 48 teeth, respectively, gear 120 will always rotate at about one-hundred fifteen and six-tenths percent (115.6%) of the rotational speed of gear 118. Further, as clutch sleeve 126 is shifted directly between the first and second Positions thereof (i.e. no neutral position for gear train 200), during a shift transient, the shaft 28A and clutch sleeve 126, and the clutch members 134 and 136, will be rotating at substantially the same speed as the just disengaged gear 118 or 120.

Accordingly, for shifts of gear train 200 in a given direction of rotation for shaft 28A, during an engagement of clutch 204, clutch teeth 134 will be initially rotating faster than clutch teeth 138 and the leading edge 208 of clutch teeth 134 will be in contact with the trailing edge 210 of clutch teeth 138. For shifts of gear train 200 in the given direction of rotation for shaft 28A, during an engagement of clutch 206, clutch teeth 136 will initially rotate slower than clutch teeth 140 and the trailing edge 212 of clutch teeth 136 will be contacted by the leading edge 214 of clutch teeth 140.

Figure 2:
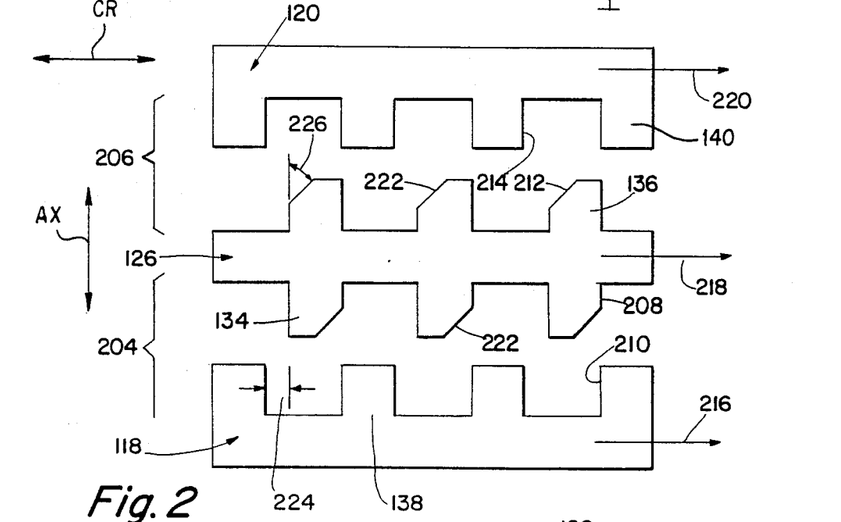
FIG. 2 is a schematic illustration of the clutch mechanisms utilized with the present invention.

Referring to FIG. 2 a layout view, arrows 216, 218 and 220 represent the rotational speeds of gear 118, clutch sleeve 126/shaft 28A and gear 120, respectively. The value of 220 is always about 115.6% of the value of 216. The arrows CR and AX, respectively, indicate the circumferential direction and axial direction, respectively, of relative movement in FIGS. 2 and 7. Rotational movement of clutch member 120 relative to clutch member 126 will result in a relative movement of clutch teeth 214 relative to clutch teeth 136 in the circumferential direction.

The leading edges 208 of clutch teeth 134 and trailing edges 212 of clutch teeth 136 are provided with ramps 222. Alternatively, ramps could be provided on trailing edges 210 and leading edges 214 or on all of the initial contact edges 208, 210, 212 and 214.

The ramps 222 are dimensioned such that under the relatively light engaging force provided by actuator 202, if clutch 126 is overspeeding gear 118, (i.e. rotating at about speed of just disengaged gear 120) the ramps will cause an axially separating or ratcheting force sufficient to prevent engagement of clutch 204. However, as clutch 126 is caused to rotate at an equal and then relatively slower speed than gear 118, the ramps 222 will not contact teeth 138 under force and the relatively large initial penetration will allow the clutch members or teeth 134 and 138 of positive clutch 204 to quickly and smoothly engage at substantially synchronous speed.

Similarly, ramps 222 are dimensioned such that under the relatively light engaging force provided by actuator 202, if clutch 126 is underspeeding gear 120 (i.e. rotating at about speed of just disengaged gear 18) the ramps will cause an axially separating or ratcheting force sufficient to prevent engagement of clutch 206. However, as clutch 126 is caused to rotate at an equal and then relatively faster speed than gear 120, the ramps 222 will not be forced into contact with clutch teeth 140 and the relatively large initial penetration will allow a rapid and smooth engagement of clutch 206 at substantially synchronous conditions.

In the engaging position, the clutch members, 134 and 138 of clutch 204 or 136 and 140 of clutch 206, are being resiliently urged into, or are maintained in, axial engagement.

The resiliency is provided by spring biasing devices as illustrated in above-mentioned U.S. Pat. No. 3,799,002 and/or by the use of pressurized compressible fluid operators.

Figure 7:
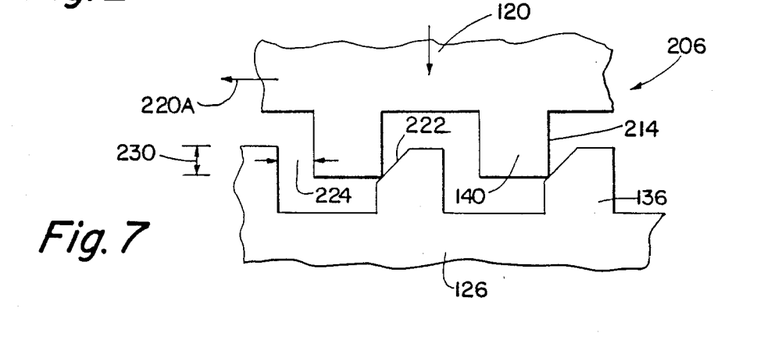
FIG. 7 is an enlarged schematic illustration of tendency of the clutch teeth of the present invention to achieve initial penetration upon a crossing of synchronous.

Referring to FIG. 7, when clutch teeth 140 are caused to rotate slightly in the direction of arrow 220A relative to clutch teeth 136, i.e. just as the clutch 206 passes through synchronous, the surfaces 214 of teeth 140 will ride down ramps 222 to achieve a large initial axial penetration 230 at the time of maximum backlash 224 between the engaging teeth. Due to this large initial penetration, the clutch will engage "one tooth past synchronous" for smooth, positive engagements which are relatively insensitive to clutch tooth backlash.

While the present invention relates to many types of two-speed gear trains, it is especially advantageous in splitter type gearing wherein the ratio steps are relatively small.

Accordingly, it may be seen that an improved two-speed gear train, such as the splitter type auxiliary section or subsection of a compound transmission is provided.

The description of the preferred embodiments of the present invention is by way of example only and various modifications and/or rearrangement of the parts are contemplated without deParting from the spirit and the scope of the invention as hereinafter claimed.

I claim:

1. A two-speed gear only train assembly (200) comprising:
   a first shaft (28A) having a primary direction of rotation;
   a first rotatable member (118) rotatable relative to said first shaft (28A); p1 a second rotatable member (120) rotatable relative to said first rotatable member and relative to said first shaft;
   drive means (112, 106, 114) in constant driving relation with said first and second rotatable members, said drive means causing said second rotatable member to rotate in the same direction and faster than said first rotatable member;
   A first positive non-synchronized clutch (204) for selectively clutching said first rotatable member (118) to said first shaft (28A), said first clutch comprising a first array of clutch teeth (138) carried by said first rotatable member (118) and a second array of clutch teeth (134) fixed for rotation with said first shaft (28A) and engageable with said first array of clutch teeth;
   a second positive non-synchronized clutch (206) for selectively clutching said second rotatable member (120) to said first shaft (28A), said second clutch comprising a third array of clutch teeth (140) carried by said second rotatable member (120) and a fourth array of clutch teeth (136) fixed for rotation with said first shaft (28A) and engageable with said third array of clutch teeth;
   said arrays of clutch teeth (134, 136, 138, 140), when rotating in said primary direction of rotation, defining rotationally leading edges (208, 214) and rotationally trailing edges (210, 212);
   actuator means (202, 142) for selectively engaging and disengaging said first (204) and second (206) clutches, said actuator means having a first position wherein said first (138) and second (134) arrays of clutch teeth are urged into engagement with a predetermined axial force and said third (140) and fourth (136) arrays of clutch teeth are separated and a second position (FIG. 4A) wherein said third (140) and fourth (136) arrays of clutch teeth are urged into engagement with a predetermined axial force and are separated, said actuator means moving directly from one said first and second positions to the other of said first and second positions with no selectable maintainable intermediate position;
   said assembly characterized by:
   one of said first clutch teeth trailing edges (210), second clutch teeth leading edges (208), third clutch teeth leading edges (214) and fourth clutch teeth trailing edges (212) are provided with ramps (222) for engagement with the clutch tooth edges engageable therewith, said ramps inclined axially toward and circumferentially away from the teeth edge engageable thereby and configured to provide an axial separation force, relative to the clutch tooth edges urged into contact therewith sufficient to prevent engagement of the clutch defined by the clutch teeth carrying the ramped edge and the clutch teeth contacted thereby (i) when engaging said first clutch if said first array (138) is rotating slower than said second array (134) and (ii) when engaging said second clutch if said third array (140) is rotating slower than said forth array (136), all of said first clutch teeth leading edges, second clutch teeth trailing edges, third clutch teeth trailing edges and forth clutch teeth leading edges defined by substantially noninclined axially extending surfaces.

2. The assembly of claim 1 wherein said gear train defines a portion of a vehicular drive train, said primary direction of rotation corresponding to forward motion of said vehicle.

3. The gear train assembly of claim 2 wherein said second clutch teeth (134) and fourth clutch teeth (136) are carried by a common clutch sleeve (126), said clutch sleeve mounted to said first shaft 28A) for axial movement relative thereto and rotational movement therewith.

4. A two-speed only gear train assembly (200) comprising:
   a first rotatable shaft (28A) having a primary direction of rotation;
   a first gear (118) coaxial with and rotatable relative to said first shaft;

a second gear (120) coaxial with and rotatable relative to said first shaft;

a third gear (112) constantly meshed with said first gear, said third gear fixed for rotation with a second shaft (106);

a fourth gear (114) constantly meshed with said second gear, said fourth gear fixed for rotation with said second shaft;

the ratio of the number of gear teeth on said first gear to the number of gear teeth on said third gear being less than the ratio of the number of gear teeth on said second gear to he number of gear teeth on said fourth gear whereby said second gear will rotate faster than and in the same direction as said first gear;

a first positive non-synchronized clutch (204) for selectively clutching said first gear (118) to said first shaft (28A), said first clutch comprising a first array of clutch teeth (138) carried by said first gear (118) and a second array of clutch teeth (134) fixed for rotation with said first shaft (28A) and engageable with said first array of clutch teeth;

a second positive non-synchronized clutch (206) for selectively clutching said second gear (120) to said first shaft (28A), said second clutch comprising a third array of clutch teeth (140) carried by said second gear (120) and a fourth array of clutch teeth (136) fixed for rotation with said first shaft (28A) and engageable with said third array of clutch teeth;

said arrays of clutch teeth (134, 136, 138, 140), when rotating in said primary direction of rotation, defining rotationally leading edges (208, 214) and rotationally trailing edges (210, 212);

actuator means (202, 142) for selectively engaging and disengaging said first (204) and second (206) clutches, said actuator means having a first position wherein said first (138) and second (134) arrays of clutch teeth are urged into engagement with a predetermined axial force and said third (140) and fourth (136) arrays of clutch teeth are separated and a second position wherein said third (140) and fourth (136) arrays of clutch teeth are urged into engagement with a predetermined axial force and said first (138) and second (134) arrays of clutch teeth are separated, said actuator means moving directly between said first and second positions thereof with no maintainable intermediate position;

said assembly characterized by:

one of said first clutch teeth trailing edges (210), second clutch teeth leading edges (208), third clutch teeth leading edges (214) and fourth clutch teeth trailing edges (212) are provided with ramps (222) for engagement with the clutch tooth edges engageable therewith, said ramps inclined axially toward and circumferentially away from the teeth edge engageable thereby and configured to provide an axial separation force, relative to the clutch tooth edges urged into contact therewith sufficient to prevent engagement of the clutch defined by the clutch teeth carrying the ramped edge and the clutch teeth contacted thereby (i) when engaging said first clutch if said first array (138) is rotating slower than said second array (134) and (ii) when engaging said second clutch if said third array (140) is rotating slower than said forth array (136), all of said first clutch teeth leading edges, second clutch teeth trailing edges, third clutch teeth trailing edges and forth clutch teeth leading edges defined by substantially noninclined axially extending surfaces.

5. The assembly of claim 4 wherein said gear train defines a portion of a vehicular drive train, said Primary direction of rotation corresponding to forward motion of said vehicle.

6. The gear train assembly of claim 5 wherein said second (134) and fourth (136) clutch teeth are carried by a double sided clutch sleeve (126) mounted to said first shaft (28A) for axial movement relative thereto and rotational movement therewith.

7. The gear train assembly of claim 6 wherein said clutch sleeve (126) is axially interposed said first and third arrays of clutch teeth, said clutch sleeve axially moved to a selected one of two selectable positions by said actuator including a pressurized gas piston/cylinder assembly.

8. A combined range and splitter type auxiliary transmission section (102) for a compound change gear transmission (100) comprising a main transmission section (12A) connected in series with an auxiliary transmission section, said auxiliary transmission section comprising a housing (H), an auxiliary section input shaft (28A) extending into said housing and driven by said main transmission section said auxiliary section input shaft rotating in a primary direction of rotation and an output shaft (122) extending from said housing, said auxiliary transmission section characterized by;

a splitter gear (118), a splitter/range gear (120) and a range gear (124) all generally coaxial with and rotatable relative to said auxiliary section input shaft and said output shaft;

an auxiliary section countershaft assembly (104) comprising an auxiliary countershaft (106) rotationally supported in said housing, a first auxiliary countershaft gear (112) rotationally fixed to said auxiliary countershaft and constantly meshed with said splitter gear, a second auxiliary countershaft gear (114) rotationally fixed to said auxiliary countershaft and constantly meshed with said splitter/range gear and a third auxiliary countershaft gear (116) rotationally fixed to said auxiliary countershaft and constantly meshed with said range gear;

a two-position splitter clutch assembly including a double sided clutch sleeve (126) fixed for rotation with said auxiliary section input shaft and having a first position for coupling said splitter gear to said auxiliary section input shaft and a second position for coupling said splitter/range gear to said auxiliary section input shaft;

a two-position range clutch assembly (128) fixed for rotation with said output shaft and having a first position for coupling said splitter/range gear to said output shaft and a second position for coupling said range gear to said output shaft; and control means for independently positioning each of said splitter clutch assembly and range clutch assembly in a selected one of the two positions thereof;

said main transmission section including a transmission input shaft (16) and providing a plurality of selectable forward speed ratios, having substantially equal ratio steps, between the transmission input shaft and said auxiliary section input shaft, wherein:

(A/D)×(E/B) is generally equal to the square root of the average main transmission section ratio step, and (C/F)×(E/B) is generally equal to the average main transmission section ratio step raised to the N power, wherein:

A=number of teeth on the splitter gear,
B=number of teeth on the splitter/range gear,
C=number of teeth on the range gear,
D=number of teeth on the first auxiliary countershaft gear,
E=number of teeth on the second auxiliary countershaft gear,
F=number of teeth on the third auxiliary countershaft gear, and
N=number of selectable main transmission section forward ratios utilized in both the high and the low ranges;

said auxiliary transmission section characterized by;

said splitter clutch assembly defining a first positive non-synchronized clutch (204) for selectively clutching said splitter gear (118) to said auxiliary section input shaft (28A), said first clutch comprising a first array of clutch teeth (138) carried by said splitter gear (118) and a second array of clutch teeth (134) carried by said sleeve (126) and engageable with said first array of clutch teeth, and a second positive non-synchronized clutch (206) for selectively clutching sail splitter/range gear (120) to said auxiliary section input shaft (28A), said second clutch comprising a third array of clutch teeth (140) carried by said splitter range gear (120) and a fourth array of clutch teeth (136) carried by said clutch sleeve (126) and engageable with said third array of clutch teeth;

said arrays of clutch teeth (134, 136, 138, 140), when rotating in said primary direction of rotation, defining leading edges (208, 214) and trailing edges (210, 212);

one of said first clutch teeth trailing edges (210), second clutch teeth leading edges (208), third clutch teeth leading edges (214) and fourth clutch teeth trailing edges (212) are provided with ramps (222) for engagement with the clutch tooth edges engageable therewith, said ramps inclined axially toward and circumferentially away form the teeth edge engageable thereby and configured to provide an axial separation force, relative to the clutch tooth edges urged into contact therewith sufficient to prevent engagement of the clutch defined by the clutch teeth carrying the ramped edge and the clutch teeth contacted thereby (i) when engaging said first clutch if said first array (138) is rotating slower than said second array (134) and (ii) when engaging said second clutch if said third array (140) is rotating slower than said forth array (136), all of said first clutch teeth leading edges, second clutch teeth trailing edges, third clutch teeth trailing edges and forth clutch teeth leading edges defined by substantially noninclined axially extending surfaces.

9. The assembly of claim 8 wherein said auxiliary section defines a portion of a vehicular drive train, said primary direction of rotation corresponding to forward motion of said vehicle.

10. The auxiliary transmission section of claim 9 wherein said range clutch assembly is a synchronized clutch for both positions thereof.

* * * * *